United States Patent
Hurtis et al.

(10) Patent No.: US 10,229,388 B2
(45) Date of Patent: Mar. 12, 2019

(54) DYNAMIC ASSET MONITORING USING AUTOMATIC UPDATING OF RULES

(75) Inventors: George M. Hurtis, Rochester, MN (US); Brian T. Kreifels, Rochester, MN (US); Manivannan Thavasi, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 2363 days.

(21) Appl. No.: 11/951,074

(22) Filed: Dec. 5, 2007

(65) Prior Publication Data

US 2009/0150264 A1    Jun. 11, 2009

(51) Int. Cl.
*G06Q 10/08* (2012.01)
*G06Q 10/10* (2012.01)

(52) U.S. Cl.
CPC ......... *G06Q 10/10* (2013.01); *G06Q 10/087* (2013.01)

(58) Field of Classification Search
CPC ... G06K 2017/0045; G06K 2017/0048; G06K 19/07767; G06K 7/10366; G01S 5/0252; G05B 19/41865; H01Q 1/22; H01Q 1/2225; G07C 9/00111; G06F 2221/2103
See application file for complete search history.

(56) References Cited

U.S. PATENT DOCUMENTS

| | | | |
|---|---|---|---|
| 5,583,486 A * | 12/1996 | Kersten | B60R 25/1003 180/287 |
| 5,708,423 A * | 1/1998 | Ghaffari | G06K 17/0022 340/5.8 |
| 5,793,290 A * | 8/1998 | Eagleson | G08B 13/2454 340/539.1 |
| 6,353,406 B1 * | 3/2002 | Lanzl et al. | 342/118 |
| 6,839,027 B2 * | 1/2005 | Krumm et al. | 342/465 |
| 6,879,247 B2 * | 4/2005 | Shimomura | B60R 25/1004 340/426.16 |
| 7,015,814 B2 * | 3/2006 | Ireland | G08B 13/126 340/572.1 |
| 7,089,099 B2 * | 8/2006 | Shostak | B60C 23/005 701/29.6 |

(Continued)

OTHER PUBLICATIONS https://www.securityinfowatch.conn/article/10610908/asset-protection-technology (Year: 2003).*

*Primary Examiner* — Florian M Zeender
*Assistant Examiner* — Dana Amsdell
(74) *Attorney, Agent, or Firm* — Steven M. Greenberg, Esq.; Shutts & Bowen LLP

(57) ABSTRACT

A novel and non-obvious method, system and computer program product for controlling movement of assets is provided. A method for controlling movement of assets can include reading a first information from a first electronic marker coupled to an asset and reading a second information from a second electronic marker of a transport mechanism in possession of the asset. The method can further include storing in a record the first and second information and a third information comprising a location of the asset. The method can further include retrieving at least one rule comprising at least one value and an action. The method can further include executing a statistical test on the information in the record and executing the action of the at least one rule if a result of the statistical test is outside a predefined confidence level. Information from the record is then added to the empirical data.

20 Claims, 9 Drawing Sheets

(56) References Cited

U.S. PATENT DOCUMENTS

| | | | | |
|---|---|---|---|---|
| 7,268,680 | B2* | 9/2007 | Gary, Jr. | G08B 21/0202 |
| | | | | 340/539.15 |
| 7,439,847 | B2* | 10/2008 | Pederson | G07C 9/00158 |
| | | | | 340/5.81 |
| 2003/0229559 | A1* | 12/2003 | Panttaja et al. | 705/36 |
| 2004/0036623 | A1* | 2/2004 | Chung | 340/825.49 |
| 2004/0066278 | A1* | 4/2004 | Hughes | G06F 21/31 |
| | | | | 340/10.1 |
| 2004/0199785 | A1* | 10/2004 | Pederson | G07C 9/00158 |
| | | | | 340/293 |
| 2005/0151641 | A1* | 7/2005 | Ulrich et al. | 340/539.13 |
| 2005/0280505 | A1* | 12/2005 | Humes et al. | 340/10.1 |
| 2005/0289061 | A1* | 12/2005 | Kulakowski | G06Q 99/00 |
| | | | | 705/50 |
| 2006/0022801 | A1* | 2/2006 | Husak et al. | 340/10.5 |
| 2006/0033609 | A1* | 2/2006 | Bridgelall | G01S 13/876 |
| | | | | 340/10.42 |
| 2007/0018811 | A1* | 1/2007 | Gollu | 340/539.13 |
| 2007/0156545 | A1* | 7/2007 | Lin | G06Q 10/00 |
| | | | | 705/28 |
| 2007/0208680 | A1* | 9/2007 | Wang et al. | 706/47 |
| 2007/0285241 | A1* | 12/2007 | Griebenow et al. | 340/572.1 |
| 2008/0016053 | A1* | 1/2008 | Frieden et al. | 707/5 |
| 2008/0125883 | A1* | 5/2008 | Gould | G05B 13/0205 |
| | | | | 700/51 |
| 2009/0327102 | A1* | 12/2009 | Maniar et al. | 705/28 |
| 2015/0134552 | A1* | 5/2015 | Engels | H04W 4/80 |
| | | | | 705/318 |

* cited by examiner

Controlled Area Table

| Control Area Type | Scanner ID | Bldg # |
|---|---|---|
| Mfg | 111111 | 102 |
| Mfg | 222222 | 102 |
| Lab | 333333 | 002 |
| Office | 444444 | 107 |

302 304 306

300

Assets Table

| Part Number | Asset Type | Asset Sub Type | Asset Controls |
|---|---|---|---|
| 21P6230 | Memory | DIMM | High Dollar |
| 97P3355 | Logic | Processor | IP Sensitive |
| 82P1214 | DASD | Seagate | Constrained |
| 44P3536 | Power | | Constrained |
| 39J3435 | Logic | Adaptor | Low Value |

312 314 316 318

310

People Table

| Employee Id | Employee Type | Shift | Responsibility |
|---|---|---|---|
| 9A2771 | Regular | First | Production |
| 8A3421 | Regular | First | Engineer |
| 3B2178 | Temporary | Second | Production |
| 7Q3399 | External | First | Other |

Event Capture Table 400

| Scanner ID | Control Area Type | Bldg | Part # | Asset Type | Asset Sub Type | Asset Control | Employee ID | Employee Type | Shift | Responsibility |
|---|---|---|---|---|---|---|---|---|---|---|
| 111111 | Mfg | 102 | 21P6230 | Memory | DIMM | High Dollar | 9AAAAA | Regular | first | Production |
| 222222 | Mfg | 102 | 97P3355 | Logic | Processor | IP Sensitive | 8BBBBB | External | first | Other |
| | | | | | | | | | | |
| | | | | | | | | | | |

Rules Table 500

| Scanner ID | Control Area Type | Bldg | Part Number | Asset Type | Asset Sub Type | Asset Controls | Employee ID | Employee Type | Shift | Responsibility | Control Action | Control Notification To: |
|---|---|---|---|---|---|---|---|---|---|---|---|---|
| 111111 | | | *Any | | | | | *Any | | | Lock Door | |
| 222222 | | | 21P6230 QTY >5 | | | | | *Any | | | email | Manager |
| 222222 | | | *Any | | | IP Sensitive | | External | | | Alarm | Manager |
| 222222 | | | | | | High Dollar | | *Any | | Engineer | Email | Manager |
| | Mfg | | 32F5556 | | | | | | | | Email | Manager |
| | Mfg | | 32F5557 | | | | | | | | Alarm & Email | Manager |
| | | | | | | | | | | | | |
| | | | | | | | | | | | | |

| Characteristic | Test | Compare | Confidence Level | Data Duration |
|---|---|---|---|---|
| External | Stat Test A | Characteristic 1&2 | 0.01 | 365 Days |
| | Stat Test B | Characteristic 1&3 | 0.05 | 180 Days |
| | Stat Test C | Characteristic 1&4 | 2 STD DEV | All |
| | Stat Test D | Characteristic 3&5 | 0.1 | All |
| | Stat Test E | Characteristic 4&7 | 0.05 | 365 Days |
| Regular | Stat Test B | Characteristic 1&2 | 0.05 | 180 Days |
| | Stat Test C | Characteristic 1&4 | 0.01 | All |
| | Stat Test D | Characteristic 1&5 | 0.1 | 30 Days |
| High Dollar | Stat Test A | Characteristic 3&6 | 0.01 | 30 Days |
| | Stat Test B | Characteristic 2&7 | 3 STD DEV | 365 Days |
| | Stat Test C | Characteristic 2&8 | 0.01 | 365 Days |
| | Stat Test D | Characteristic 2&6 | 1 STD DEV | All |
| | Stat Test E | Characteristic 5&6 | 0.05 | All |
| Card Crib | Stat Test D | Characteristic 5&8 | 0.1 | 365 Days |
| | Stat Test E | Characteristic 3&7 | 2 STD DEV | All |

FIG. 6

DYNAMIC ASSET MONITORING USING AUTOMATIC UPDATING OF RULES

BACKGROUND OF THE INVENTION

Field of the Invention

The present invention relates to commercial asset control, and more particularly to providing dynamic asset control using a variety of variables.

Description of the Related Art

Asset control is a critical capability required in numerous business environments. Whether managing production parts movement, retail merchandise loss or facilitating baggage control at airports, it is desirable to automatically detect and deter unauthorized movement of assets from a controlled area. Manufacturing environments, for example, typically involve the movement of many parts (assets) of varying cost and intellectual sensitivity into and out of production areas. Certain areas often require access be given to production personnel, as well as other engineers, developers and even external contractors. In such areas, it is necessary to allow the movement of parts into and out of the production floor by authorized personnel, while restricting their movement by others. Parts loss through theft or inadvertent movements can seriously impact business performance.

Conventional asset tracking systems employ Radio Frequency Identification (RFID) tags that trigger a static response when movement of the asset is sensed as it passes a control point. For example, as a piece of controlled merchandise passes the door sensors at a retail store, alarms sound. However, similar responses would occur if authorized store personnel carried the merchandise past a sensor when setting up a sidewalk sale. Presently there is no known mechanism for managing the interaction of the asset, the personnel moving the asset and other outside factors (including time sensitivity). Additionally, the current state of the art does not allow various or dynamic actions to be taken based on the interaction of the asset and the personnel.

BRIEF SUMMARY OF THE INVENTION

Embodiments of the present invention address deficiencies of the art in respect to manufacturing production and provide a novel and non-obvious method, system and computer program product for controlling movement of assets. In one embodiment of the invention, a method for controlling movement of assets can include reading a first information from a first electronic marker coupled to an asset and reading a second information from a second electronic marker of a transport mechanism in possession of the asset. The method can further include storing in a record the first information, the second information and a third information comprising a location of the asset. The method can further include retrieving at least one rule comprising at least one value and an action, wherein the at least one value is based on empirical data. The method can further include executing a statistical test on the information in the record as compared to the at least one value. The method can further include executing the action of the at least one rule if a result of the statistical test is outside a predefined confidence level. The method can further include adding information from the record to the empirical data.

In another embodiment of the invention, a computer program product comprising a computer usable medium embodying computer usable program code for controlling movement of assets can include computer usable program code for reading a first information from a first electronic marker coupled to an asset and computer usable program code for reading a second information from a second electronic marker of a person in possession of the asset. The computer program product can further include computer usable program code for storing in a record the first information, the second information and a third information comprising a location of the asset. The computer program product can further include computer usable program code for retrieving at least one rule comprising at least one value and an action, wherein the at least one value is based on empirical data. The computer program product can further include computer usable program code for executing a statistical test on the information in the record as compared to the at least one value. The computer program product can further include computer usable program code for executing the action of the at least one rule if a result of the statistical test is outside a predefined confidence level. The computer program product can further include computer usable program code for adding information from the record to the empirical data.

In yet another embodiment of the invention, a system on a computer for controlling movement of assets can be provided. The system can include a scanner for reading a first information from a first electronic marker coupled to an asset and for reading a second information from a second electronic marker of a person in possession of the asset. The system further can include memory for storing in a record the first information, the second information and a third information comprising a location of the asset. Finally, the system can include a processor configured for retrieving at least one rule comprising at least one value and an action, wherein the at least one value is based on empirical data, executing a statistical test on the information in the record as compared to the at least one value, executing the action of the at least one rule if a result of the statistical test is outside a predefined confidence level and adding information from the record to the empirical data.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 3 shows various tables depicting the types of data that may be collected for various components of the dynamic asset monitoring system, according to one embodiment of the present invention;

FIG. 4 shows a table depicting the data that may be collected during event capture of the dynamic asset monitoring system, according to one embodiment of the present invention;

FIG. 5 is a table depicting the definition of rules used by the dynamic asset monitoring system, according to one embodiment of the present invention;

FIG. 6 is a table depicting the definition of statistical tests used by the dynamic asset monitoring system, according to one embodiment of the present invention.

DETAILED DESCRIPTION OF THE INVENTION

Embodiments of the present invention provide a method, system and computer program product for controlling movement of assets. In accordance with an embodiment of the present invention, a first electronic marker is coupled to an asset and a second electronic marker is coupled to a person in possession of the asset, wherein an electronic marker may be an RFID tag. A scanner may read a first information and a second information from the electronic markers. Next, the first and second information and a third information comprising a location of the asset are stored in a record. Subsequently, at least one predefined rule is retrieved, wherein a rule comprises at least one value and an action. Next, the information in the record is compared to the at least one value. If the information in the record matches the at least one value, the action of the at least one rule is executed.

Embodiments of the present invention further provide a method, system and computer program product for controlling movement of assets. In accordance with an embodiment of the present invention, a first electronic marker is coupled to an asset and a second electronic marker is coupled to a person in possession of the asset, wherein an electronic marker may be an RFID tag. A scanner may read a first information and a second information from the electronic markers. Next, the first and second information and a third information comprising a location of the asset are stored in a record. Subsequently, at least one predefined rule is retrieved, wherein a rule comprises at least one value and an action and wherein the rule is based on empirical data. Next, a statistical test is executed on the information in the record compared to the at least one value. If the result of the statistical test is within a predefined confidence level, the action of the at least one rule is executed. Then, the information from the record is added to the empirical data. At predefined intervals, a second statistical test is performed on the empirical data to determine whether the at least one value of the rules should be modified so as to fall within a predefined confidence level. Lastly, the at least one value of the rules is modified so as to fall within a predefined confidence level, if the result of the second statistical test warrants a modification.

Figure 1:
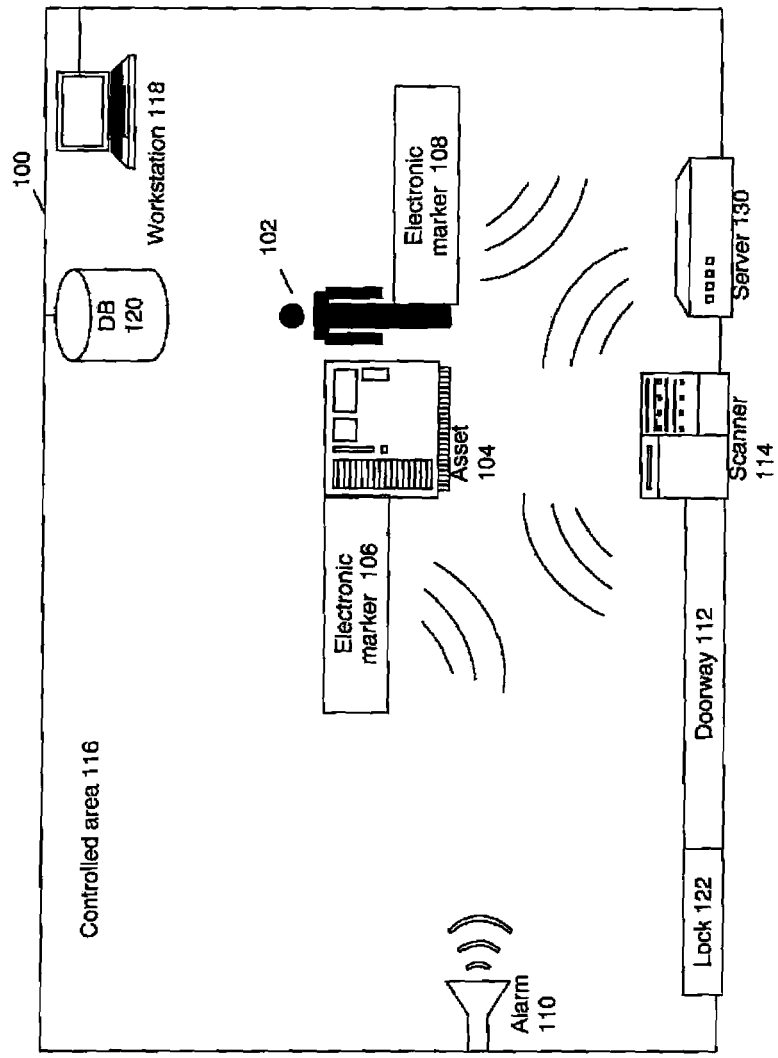
FIG. 1 is a block diagram illustrating the various components of a dynamic asset monitoring system, in accordance with one embodiment of the present invention.

FIG. 1 is a block diagram illustrating the various components of a dynamic asset monitoring system 100, in accordance with one embodiment of the present invention. FIG. 1 shows a controlled area 116 that may comprise a room, a building, an area, a group of rooms or buildings or a section of an area. The dynamic asset monitoring system 100 monitors and asserts control over assets and individuals within the controlled area 116.

FIG. 1 further shows an individual 102, such as an employee, in possession of an asset 104 to which an electronic marker 106 is coupled. Alternatively, the person 102 can be any transport mechanism, such as a vehicle or a conveyor belt. The asset 104 may be any product that is sought to be controlled such as computer parts or products, electronic parts or products, jewelry, works of art, airport baggage, hospital or clinic items or records, or any other merchandise or products. The employee 102 also carries an electronic marker 108, which may be in the form of a pass card or electronic pass key. Electronic marker 106 and marker 108 may be an RFID tag, magneto acoustic marker, a magnetic stripe card, a smart card or any other item that can be read by interfacing with the item, scanning the item or by reading of identifying data emitted by the item. In an embodiment of the present invention, an alternative for the electronic marker 108 is a biometric method for identifying the employee 102.

FIG. 1 further shows a scanner 114 located adjacent to a doorway or a door 112. The scanner 114 comprises a unit that utilizes radio frequency or magnetic emissions to read information from the electronic markers 106, 108. The doorway or door 114 comprises a method of ingress and/or egress to and from the controlled area 116. A lock 122 is coupled with the door 114 so as to lock and secure the door 144 upon command. An alarm 110 is also located with the controlled area 116 and comprises an acoustic and/or visual alarm that is activated upon command.

Also shown in FIG. 1 is a server 130 which substantially performs the asset control functions of the present invention. The server 130 comprises a computer or group of computers that are coupled, such as via a network, with the lock 122, the alarm 110 and the scanner 114. When an employee 102 approaches the door 112, the scanner 114 scans the electronic markers 106, 108 and sends the data garnered from the electronic markers to the server 130. The server 130 then determines the appropriate action to take, according to rules set up by an administrator. The server 130 may subsequently order the alarm 110 to sound or the lock 122 to lock the door 112. Alternatively, the server 130 may order that a notice be sent to an individual, such as a manager at workstation 118, which is also connected to the server 130 via the network. The server 130 may also order that the event be logged in a database 120, which is also connected to the server 130 via the network. The processes performed by server 130 are described in greater detail below with reference to FIG. 2.

FIG. 3 shows various tables depicting the types of data that may be collected for various components of the dynamic asset monitoring system 100, according to one embodiment of the present invention. The first table 300 shows the types of data that may be collected for a controlled area, such as controlled area 116 of FIG. 1. Each row of the table 300 shows the data corresponding to one controlled area, wherein each column shows the particular value of one attribute of the controlled area. The first column 302 of table 300 is populated with the type of a controlled area, such as an office, a laboratory or a manufacturing area. The type of a controlled area indicates the access that certain employees should have to such an area. A controlled area type may be represented using a number that corresponds to a type or may be represented by a character string that spells out the controlled area type.

The second column 304 of table 300 is populated with a unique identifier for a scanner, such as scanner 114 of FIG. 1, which scanned or received the electronic marker from which the event data was captured. A unique identifier for a scanner may be represented using a number or an alphanumeric character that corresponds to an identifier. The third column 306 of table 300 is populated with a unique identifier for a building in which the scanner was located. A unique identifier for a building may be represented using a number or an alphanumeric character that corresponds to an identifier. The identity of a scanner or building indicates the access that certain employees should have to such an exit or a building.

The second table 310 shows the types of data that may be collected for an asset, such as asset 104 of FIG. 1. Each row of the table 310 shows the data corresponding to one asset, wherein each column shows the particular value of one attribute of the asset. The first column 312 of table 310 is populated with a part number for an asset. A part number may be represented using a number or an alphanumeric character. The second column 314 of table 310 is populated with a general type of asset, such as a memory module, a logic module, etc. An asset type may be represented using a number that corresponds to a type or may be represented by a character string that spells out the asset type. The third column 316 of table 310 is populated with the sub-type of the asset, such as a DIMM, a processor, etc. An asset sub-type may also be represented using a number or a character string. The identity or type of an asset indicates the access that certain employees should have to the asset or asset type.

The fourth column 318 of table 310 is populated with an asset control type for the asset. An asset control type indicates the type of controls that shall be applied to the asset. For example, an asset control type of "low value" indicates that low level control should be applied to an asset while an asset control type of "high dollar" indicates that high level control should be applied to an asset because of its financial value. Likewise, an asset control type of "IP sensitive" indicates that high level control should be performed on an asset because of its high intellectual property value. An asset control type may also be represented using a number or a character string.

The third table 320 shows the types of data that may be collected for an employee or individual, such as individual 102 of FIG. 1. Each row of the table 300 shows the data corresponding to one person, wherein each column shows the particular value of one attribute of the person. The first column 322 of table 320 is populated with a unique identifier for the employee, which may be represented using a number or an alphanumeric character. The second column 324 of table 320 is populated with a type of employee, such as a regular employee, a temporary employee or an external employee. An employee type may be represented using a number that corresponds to a type or may be represented by a character string that spells out the employee type. An employee identifier or employee type indicates the type of access that the employee should have to certain areas, buildings or assets.

The third column 326 of table 320 is populated with a shift type of the employee, which defines the normal work hours of an employee. A shift type may also be represented using a number or a character string. The fourth column 328 of table 320 is populated with a responsibility type for an employee. A responsibility type indicates the type of responsibilities that are held by an employee. For example, a responsibility type of "engineer" indicates that the employee works in an engineering group that constructs or builds components of a system and therefore he must have access to certain assets. A responsibility type of "production" indicates that the employee works on producing the products that are sold by the employer and therefore requires certain types of access to particular assets. A responsibility type may also be represented using a number or a character string.

FIG. 4 shows a table 400 depicting the data that may be collected during event capture of the dynamic asset monitoring system 100, according to one embodiment of the present invention. Specifically, the table 400 shows the data that may be collected by a scanner 114 during event capture of the dynamic asset monitoring system 100. Each row of the table 400 shows the data corresponding to one event, wherein each column shows the particular value of one attribute of the event.

Table 400 shows that each column shown in the tables 300, 310 and 320 of FIG. 3 are represented in table 400. Column 402 is populated with a unique scanner identifier, column 404 is populated with a controlled area type, column 406 is populated with a unique building identifier, column 408 is populated with a part number, column 410 is populated with an asset type, column 412 is populated with an asset sub-type, column 414 is populated with an asset control type, column 416 is populated with a unique employee identifier, column 418 is populated with an employee type indicator, column 420 is populated with an employee shift indicator, column 422 is populated with an employee responsibility indicator.

FIG. 5 shows a table 500 depicting the definition of rules used by the dynamic asset monitoring system 100, according to one embodiment of the present invention. The table 500 includes all of the columns of table 400 except that two additional columns are included—column 514 for indicating the type of control action to take and column 516 for indicating to whom notification shall be given if control action is taken. Each row of the table 500 shows the values or range of values corresponding to one rule, wherein each column shows the particular value of one attribute of the rule.

Each rule is a set of statements that, if true, produce a match. That is, any captured event that meets the criteria described in the set of statements produces a match. Each rule lists one or more attribute values that, if present in a captured event, produce a match. An attribute value may be specified in a positive manner, wherein the existence of the specified attribute value produces a match. For example, specifying a part number as "32F5556'" would produce a match with a scanned asset having the exact part number. Alternatively, an attribute value may be specified in a negative manner, wherein the lack of the specified attribute value produces a match. For example, specifying a part number as "NOT 32F5556'" would produce a match with a scanned asset having any part number except for the one specified. Further, attribute values may be specified in a range such that any attribute value that falls within that range produces a match. For example, specifying a part number as "32F5556 to 32F5560'" would produce a match with a scanned asset having any part number between the two specified. Additionally, attribute values may be specified using a wildcard. For example, specifying a part number as would produce a match with a scanned asset having any part number.

A rule defined in table 500 includes values or ranges of values that are stated for any attribute of table 400. For example, for the fifth rule located in the fifth row of table 500, values are inserted for controlled area type in column 504, asset control type in column 508 and employee responsibility type in column 512. Thus, the rule seeks an event where an asset of asset control type "high dollar" is taken out of a controlled area type of "manufacturing" by an employee of employee responsibility type "engineer." If this event is captured, then the rule states that an email, as stated in column 514, is sent to a manager of the employee, as stated in column 516.

In another example, for the first rule located in the first row of table 500, values are inserted for a scanner identifier in column 502, part number in column 506 and employee type in column 510. Note that the use of an asterisk (*) denotes a wildcard that represents any possible value. Thus, the rule seeks a situation where the scanner with identifier "1111" captures an event where an asset with any part number is taken out of a controlled area type by an employee of any type. If this event is captured, then the rule states that the exit door (such as door 112) is locked (such as by lock 122) so as to stop egress of the employee form the controlled area.

The rules may be input into a database coupled with or accessible to server 130 by an administrator or other worker via a work station, such as workstation 118. A rule may take various forms, such as a text string or a set of numbers.

Figure 2:
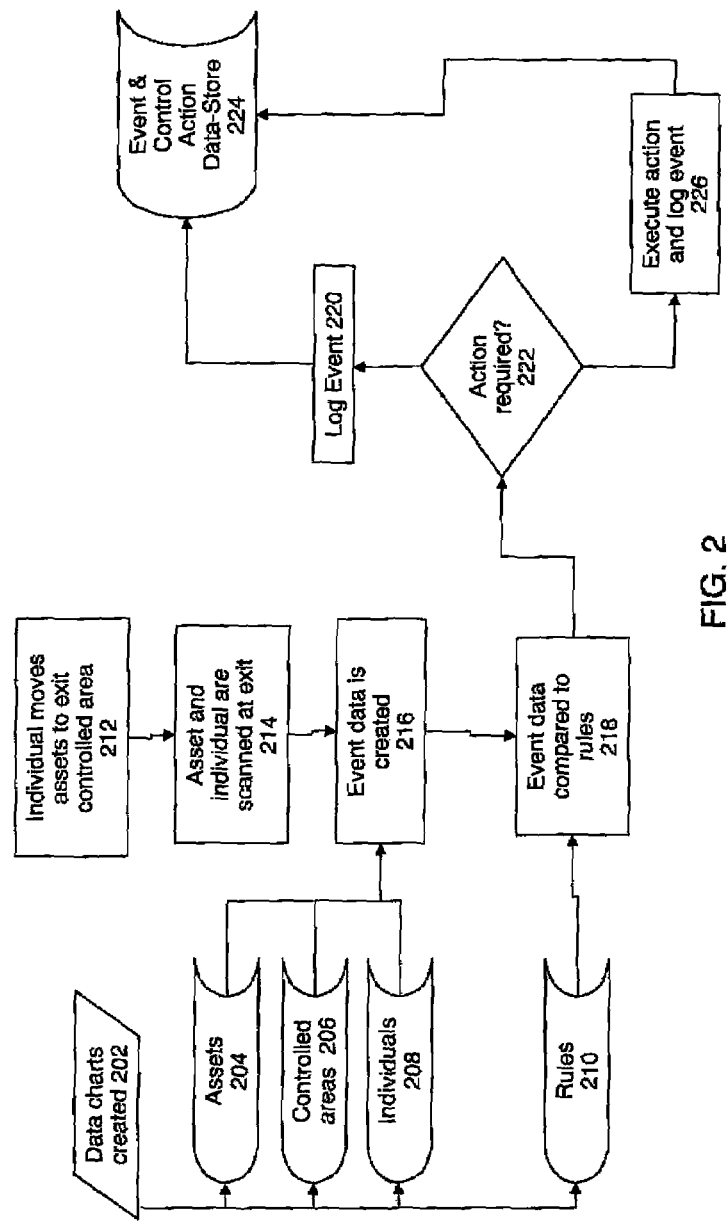
FIG. 2 is a flow chart depicting a general process for dynamic monitoring of assets, according to one embodiment of the present invention.

FIG. 2 is a flow chart depicting a general process for dynamic monitoring of assets executed by a dynamic asset monitoring system 100, according to one embodiment of the present invention. The process of FIG. 2 provides a process by which the dynamic asset monitoring system 100 captures data about movement of assets and asserts a level of control over the movement of those assets.

In step 202, various data charts or tables are created, wherein each data chart or table comprises information about the various components about which data shall be captured during event. In step 204, an asset data table such as table 310 of FIG. 3 is created by an administrator or other individual. In step 206, a controlled area data table such as table 300 of FIG. 3 is created. In step 208, a people data table such as table 320 of FIG. 3 is created. In step 210, a rule table such as table 500 of FIG. 5 is created.

In step 212, an individual such as employee 102 moves towards an exit such as doorway 112 in a controlled area 116. The employee carries an asset 104 coupled with an electronic marker 106 and further carries a personal an electronic marker 108. In step 214, the scanner 114 scans the electronic marker 106 and electronic marker 108. In step 216 the scanner 114 captures data from the electronic markers 106, 108, which data is inserted into one row of an event capture data table, such as table 400 of FIG. 4.

In step 218, the rules 210 are applied to the data captured and inserted into one row of an event capture data table in step 216. In step 222 it is determined whether the application of the rules requires that an action is executed. For example, if a rule indicates that a control action, as specified in columns 514, 516 of table 500, should be executed, then the result of the determination of step 222 is positive and control flows to step 226. Otherwise, control flows to step 220.

In step 220, the event data captured by the scanner 114 and inserted into one row of an event capture data table, such as table 400, is logged. This may occur via the storing of the event data in a database, such as database 120. In step 226, the control action, as specified in columns 514, 516 of table 500 for the particular rule, is executed. Further in step 226, the event data is logged, such as via the storing of the event data in a database, such as database 120. In step 224, the event data, as well as any control actions executed, are logged in a data store, such as a database, that maintains statistics regarding the number and frequency of events, the data captured during those events and the number and frequency of control actions executed in response to those events.

FIG. 6 is a table 600 depicting the definition of statistical tests used by the dynamic asset monitoring system 100, according to one embodiment of the present invention. Specifically, the table 600 shows which tests shall be performed on particular attributes of a captured event by the dynamic asset monitoring system 100. Each row of the table 600 shows one particular group of statistical tests, wherein each column includes data that is used to indicate which test to apply.

The first column 602 of the table 600 indicates a characteristic that corresponds to an attribute of a captured event, such as any attribute indicated in the event capture table 400 of FIG. 4. The second column 604 indicates a variety of statistical tests available to be applied to an event. A statistical test can be any one or more of a statistical Z-test, a statistical T-test, a statistical regression analysis, a statistical Chi-square test, or any variations or combinations of the foregoing.

The third column 606 indicates which characteristics or attributes of a captured event shall be compared for a given statistical test. For example, for statistical test A of the first row, the first and second characteristics or attributes shall be compared, but for statistical test B of the first row, the first and third characteristics or attributes shall be compared. The fourth column 608 indicates a desired confidence level for a given statistical test. A confidence interval is an interval estimate of a population parameter. The fifth column 610 indicates a time period indicating a sample identifier for a given statistical test.

In one example, assume that an event has captured the data shown in the first row of table 400 of FIG. 4. In this case, the table 600 is consulted to determine how to select a statistical test to apply to the event capture data. First, one determines upon which characteristic or attributes to apply a statistical test. Certain attributes are more germane to issues of employee permissions for moving assets. For this reason, concentrating statistical tests on germane or important attributes is desirable. Thus, assume that the statistical test shall be applied upon the employee type attribute. This leads one to the first row of table 600.

Next, one moves to the next cell to the right and sees that five statistical tests A-E are provided for the employee type attribute. For the first statistical test A, the test is applied to the first and second attributes of the event data shown in the first row of table 400 of FIG. 4. Thus, the statistical test is applied to the scanner identifier (in column 402 of table 400) attribute and the control are type indicator (in column 404). Next, a data duration value is read from the column 610. For statistical test A, data duration of 365 days is applied and therefore the statistical test is applied to empirical data for the last 365 days for the selected attributes. Next, a confidence level is read from the column 608. For statistical test A, a confidence level of 0.01 is desirable.

Note that any number or combination of attributes can be selected in column 606 for a particular statistical test. Further note that confidence levels in column 608 can be described in terms of standard deviations. Lastly, note that various time periods can be denoted in column 610 and an indication of "all" denotes all data, regardless of its age.

Figure 7:
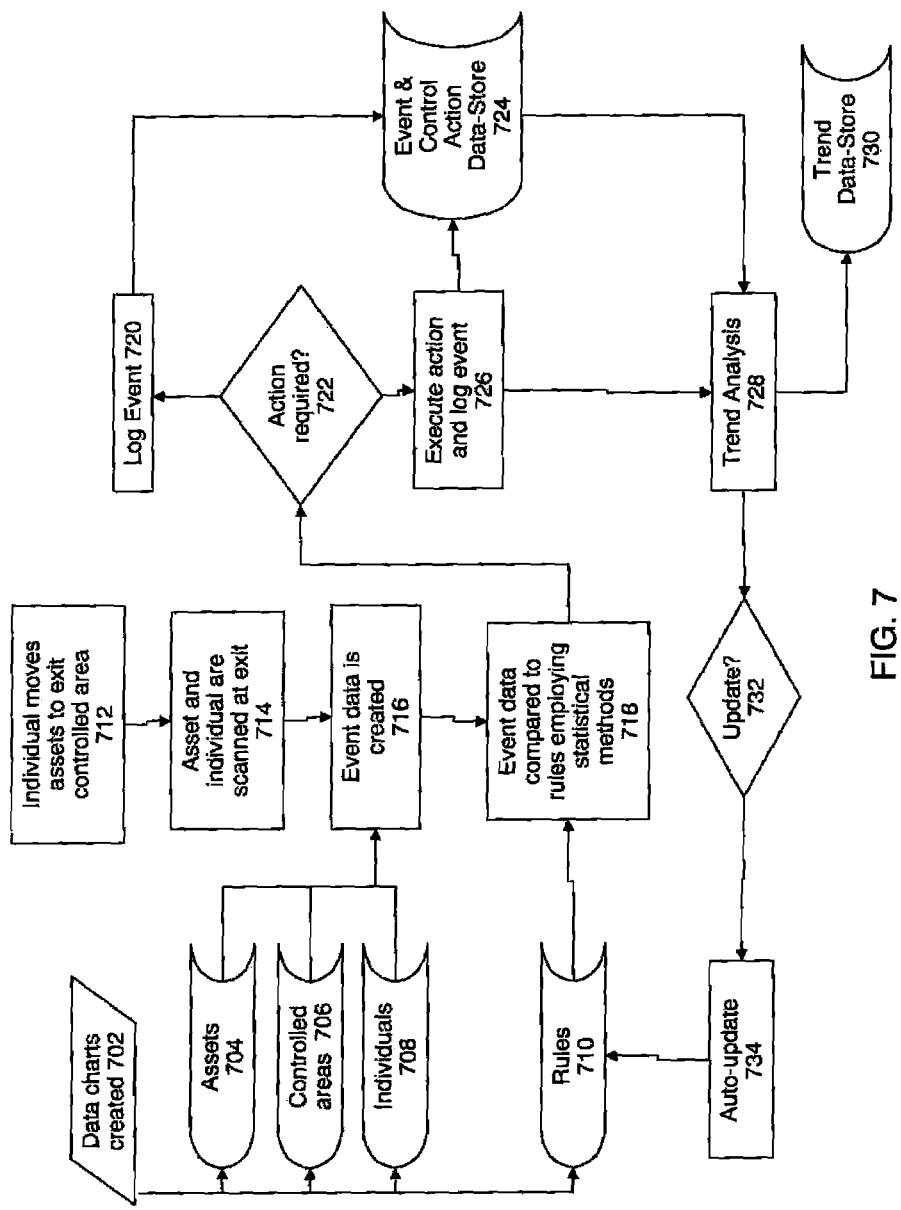
FIG. 7 is a flow chart depicting a general process for dynamic monitoring of assets using statistical methods executed by a dynamic asset monitoring system, according to one embodiment of the present invention.

FIG. 7 is a flow chart depicting a general process for dynamic monitoring of assets using statistical methods executed by a dynamic asset monitoring system 100, according to one embodiment of the present invention. The process of FIG. 7 provides a process by which the dynamic asset monitoring system 100 captures data about movement of assets and asserts a level of control over the movement of those assets using statistical methods.

The control flow of FIG. 7 differs from the control flow of FIG. 2 through the addition of a process for updating rules due to updates in empirical data upon which the rules are based. Rules are automatically updated by updating the attribute values defined in a rule to reflect changes in the empirical data. Thus, the control flow of FIG. 7 provides a method for automatically maintaining and updating the predefined rules of the control flow of FIG. 2.

In step 702, various data charts or tables are created, wherein each data chart or table comprises information about the various components about which data shall be captured during event. In step 704, an asset data table is created. In step 706, a controlled area data table is created. In step 708, a people data table is created. In step 710, a rule table is created.

In step 712, an individual moves towards an exit such as doorway 112 in a controlled area 116. The employee carries an asset 104 coupled with an electronic marker 106 and further carries a personal an electronic marker 108. In step 714, the scanner 114 scans the electronic marker 106 and electronic marker 108. In step 716 the scanner 114 captures data from the electronic markers 106, 108, which data is inserted into one row of an event capture data table, such as table 400 of FIG. 4.

In step 718, the rules 710 and statistical methods are applied to the data captured and inserted into one row of an event capture data table in step 716. This step is described in greater detail below with reference to FIG. 8.

In step 722 it is determined whether the application of the rules requires that an action is executed. If a rule indicates that a control action should be executed, then the result of the determination of step 722 is positive and control flows to step 726. Otherwise, control flows to step 720. In step 720, the event data captured by the scanner 114 is logged. In step 726, the control action is executed. Further in step 726, the event data is logged. In step 724, the event data, as well as any control actions executed, are logged in a data store.

In step 728, a trend analysis is performed wherein it is determined whether a recent captured event or groups of events warrant the modification of rule values so as to maintain event data within a predefined confidence level. This step is described in greater detail below with reference to FIG. 9. In step 732, if the result of the determination of step 728 requires modification of rule values, then rule values are updated automatically in step 734.

Figure 8:
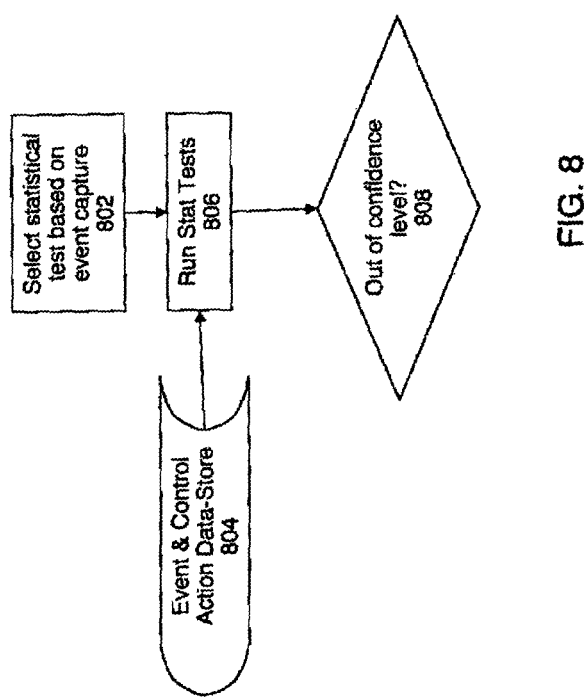
FIG. 8 is a flow chart depicting a process for selecting and executing statistical tests by a dynamic asset monitoring system, according to one embodiment of the present invention.

FIG. 8 is a flow chart depicting a process for selecting and executing statistical tests by a dynamic asset monitoring system 100, according to one embodiment of the present invention. The process of FIG. 8 provides more detail about the step 718 of FIG. 7, wherein step 718 employs statistical methods to determine whether a control action is required for a captured event. The output of step 718, as well as the flow chart of FIG. 8, is a determination of whether a control action is required for a captured event.

In step 802, a statistical test is selected based on the captured event data, suing table 600 of FIG. 6. See above with reference to FIG. 6 for a more detailed description of how a statistical test is chosen using table 600. In step 806, the statistical test or tests selected in step 806 are executed. Note that the empirical data in the data store 804 serves as an input to the calculation of step 806. In step 808, it is determined whether the results of the application of the statistical test or tests in step 806 are within the desired confidence levels defined in the corresponding row of table 600. If the result of the determination is positive, then a control action is required in step 722 of FIG. 7. If the result of the determination is negative, then a control action is not required in step 722 of FIG. 7.

Figure 9:
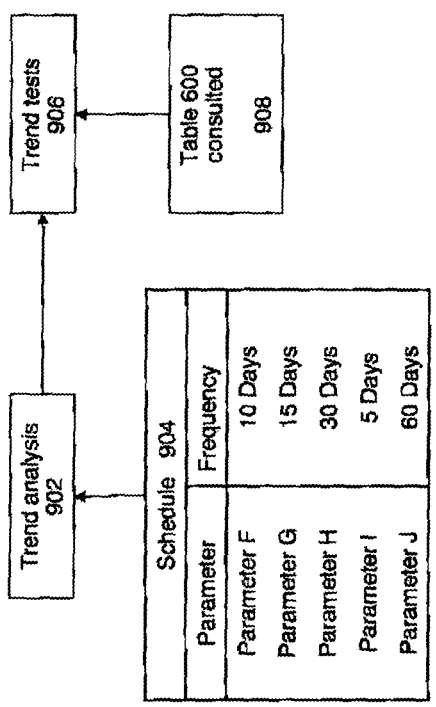
FIG. 9 is a flow chart depicting a process for updating rules by a dynamic asset monitoring system 100, according to one embodiment of the present invention.

FIG. 9 is a flow chart depicting a process for updating rules by a dynamic asset monitoring system 100, according to one embodiment of the present invention. The process of FIG. 9 provides more detail about steps 728, 732 and 734 of FIG. 7, which describes the auto-update feature of the present invention. The functions of steps 728, 732 and 734, as well as the flow chart of FIG. 9, are to determine whether a rule or rules must be updated and to update the rule or rules if needed.

In step 902 a trend analysis is executed, wherein it is determined whether an analysis of the rules should be executed in light of certain factors. Step 902 may be spawned by the execution of a control action in step 726 of FIG. 7, which is spawned due to an event occurring outside of a predefined confidence level, as calculated in step 808 of FIG. 8. Step 902 may further be spawned according to a fixed schedule, as defined in table 904 of FIG. 9. The table 904 shows a frequency defined for various parameters corresponding to attributes of a captured event, such as any attribute indicated in the event capture table 400 of FIG. 4. If the stated period of time has passed since the last instance of the application of a trend test, then a trend test is applied in step 906.

The application of a trend test in step 906 is similar to the selection and application of statistical tests, as described with reference to table 600 in FIG. 6 above. The application of a trend test in step 906 begins with consulting table 600 in step 908. Referring now to table 600 of FIG. 6, it will be shown how statistical tests are selected and applied to rules to determine whether a rule must according to the empirical data.

First, using the first column 602 of table 600, one determines upon which attribute to apply a statistical test for a rule. Next, one moves to the second column 604 of table 600. For a first statistical test, the test is applied to certain attributes of the values of a rule, as indicated in the corresponding row of column 606. Thus, the statistical test is applied to those values that are provided in a rule. Next, a data duration value is read from the column 610. The selected statistical test is applied to empirical data for corresponding data duration for the selected attributes. Next, a confidence level is read from the column 608.

Finally, the statistical test is applied and the result is either within the stated confidence level or not. Step 732 of FIG. 7 determines whether a rule or rules must be updated. If the result of the statistical test is within the stated confidence level, then a rule or rules need not be updated. If the result of the statistical test is not within the stated confidence level, then a rule or rules must be updated. In step 734, the rule or rules are updated. In one embodiment, updating occurs automatically such that the value or values in a rule or rules are modified such that when the statistical test is applied, the result is within the stated confidence level. In another embodiment, a user is prompted before the update of the rule occurs.

In one example of the application of steps 906 and 908, assume that the rule of the fifth row of table 500 of FIG. 5 is tested so as to determine whether the rule merits updating. In this case, the table 600 is consulted to determine how to select a statistical test to apply to the rule. First, one determines upon which characteristic or attributes to apply a statistical test. We assume that the statistical test shall be applied upon the "asset control" attribute defined as "High dollar" in the rule. This leads one to the third row of table 600.

Next, one moves to the next cell to the right and sees that five statistical tests A-E are provided for the employee type attribute. For the second statistical test B, the test is applied to the second and seventh attributes of the selected rule. Thus, the statistical test B is applied to the control area type attribute (in column 504 of table 500) and the asset control attribute (in column 508). Next, a data duration value is read from the column 610. For statistical test B, data duration of 365 days is applied and therefore the statistical test is applied to empirical data for the last 365 days for the selected attributes. Next, a confidence level is read from the column 608. For statistical test B, a confidence level of three standard deviations is desirable.

Finally, the statistical test is applied and the result is either within the stated confidence level or not. If the result of the statistical test is within the stated confidence level, then the selected rule need not be updated. If the result of the statistical test is not within the stated confidence level, then the selected rule must be updated.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for controlling movement of assets, comprising:
   providing an actuator communicatively linked to both a door and an alarm;
   reading a first information into memory of a computer by a processor from a first electronic marker coupled to an asset, the first information identifying the asset;
   reading a second information into the memory by the processor from a second electronic marker of a transport mechanism in possession of the asset, the second information identifying the transport mechanism;
   storing by the processor in a record in the memory the first information, the second information and a third information comprising a location of the asset;
   retrieving from the memory at least one rule comprising at least one value and an action, wherein the at least one value is based on empirical data from past events when different assets were transported by different transport mechanisms at different locations, and the action is a locking of the door and a sounding of the alarm;
   executing by the processor a statistical test on the first information from the first electronic marker identifying the asset, the second information from the second electronic marker of the transport mechanism in the record that identifies the transport mechanism, and the third information that comprises the location of the asset in the record as compared to the at least one value;
   determining that a result of the statistical test is outside a predefined confidence level;
   responsive to the determining, executing the action by the processor of the at least one rule by directing the actuator to lock the door and sound the alarm;
   adding information from the record by the processor to the empirical data.

2. The method of claim 1, further comprising:
   executing a statistical test on the empirical data;
   modifying the at least one rule to reflect the empirical data if a result of the statistical test is outside a predefined confidence level.

3. The method of claim 1, wherein
   the first information is read from an RFID tag or a magneto acoustic marker coupled to the asset, and
   the first information includes at least one of a unique identifier for the asset, an asset type and a part number.

4. The method of claim 1, wherein
   the second information is read from an RFID tag or a magneto acoustic marker of the transport mechanism in possession of the asset, and
   the second information includes at least one of a unique identifier of a person, a type of employee, a shift indicator and an area indicator.

5. The method of claim 1, wherein at least one of a unique identifier of the location and a location type is stored in the record.

6. The method of claim 1, wherein the at least one value includes:
   a first value for at least one of a unique identifier for the asset, an asset type and a part number;
   a second value for at least one of a unique identifier of a person, a type of employee, a shift indicator and an area indicator; and a third value for at least one of a unique identifier of the location and a location type.

7. The method of claim 1, wherein the statistical test is a statistical Z-test.

8. The method of claim 7, wherein upon the information in the record matches the at least one value, the action additionally comprises at least one of logging the record, sending an electronic message and closing a method of egress from the location.

9. A computer program product comprising a computer usable storage medium having stored therein computer usable program code for controlling movement of assets, the computer usable program code, which for when executed by a computer hardware system, causes the computer hardware system to perform
   reading a first information into memory of a computer by a processor from a first electronic marker coupled to an asset, the first information identifying the asset;
   reading a second information into the memory by the processor from a second electronic marker of a transport mechanism in possession of the asset, the second information identifying the transport mechanism;
   storing by the processor in a record in the memory the first information, the second information and a third information comprising a location of the asset;
   retrieving from the memory at least one rule comprising at least one value and an action, wherein the at least one value is based on empirical data from past events when different assets were transported by different transport mechanisms at different locations, and the action is a locking of the door and a sounding of the alarm, both communicatively coupled to an actuator;
   executing by the processor a statistical test on the first information from the first electronic marker identifying the asset, the second information from the second electronic marker of the transport mechanism in the record that identifies the transport mechanism, and the third information that comprises the location of the asset in the record as compared to the at least one value;
   determining that a result of the statistical test is outside a predefined confidence level;
   responsive to the determining, executing the action by the processor of the at least one rule by directing an actuator to lock the door and sound the alarm; and,
   adding information from the record by the processor to the empirical data.

10. The computer program product of claim 9, further comprising:
    executing a statistical test on the empirical data; and
    modifying the at least one rule to reflect the empirical data if a result of the statistical test is outside a predefined confidence level.

11. The computer program product of claim 10, wherein the first information is read from an RFID tag or a magneto acoustic marker coupled to the asset, and the first information includes at least one of a unique identifier for the asset, an asset type and a part number.

12. The computer program product of claim 11, wherein the second information is read from an RFID tag or a magneto acoustic marker of the person in possession of the asset, and
    the second information includes at least one of a unique identifier of the person, a type of employee, a shift indicator and an area indicator.

13. A system on a computer for controlling movement of assets, comprising:
    an actuator communicatively coupled to a door and an alarm;
    a scanner for reading a first information from a first electronic marker coupled to an asset, the first information identifying the asset, and for reading a second information from a second electronic marker of a person in possession of the asset, the second information identifying the transport mechanism;
    memory for storing in a record the first information, the second information and a third information comprising a location of the asset; and
    a processor configured for:
    retrieving at least one rule comprising at least one value and an action, wherein the at least one value is based on empirical data from past events when different assets were transported by different transport mechanisms at different locations, and the action is a locking of the door and a sounding of the alarm;
    executing a statistical test on the first information from the first electronic marker identifying the asset, the second information from the second electronic marker of the transport mechanism in the record that identifies the transport mechanism and the third information that comprises the location of the asset in the record as compared to the at least one value;
    determining that a result of the statistical test is outside a predefined confidence level;
    responsive to the determining, executing the action by the processor of the at least one rule by directing an actuator to lock the door and sound the alarm; and,
    adding information from the record to the empirical data.

14. The system of claim 13, wherein the processor is further configured for:
    executing a statistical test on the empirical data;
    modifying the at least one rule to reflect the empirical data if a result of the statistical test is outside a predefined confidence level.

15. The system of claim 14, wherein the first electronic marker and the second electronic marker comprise any one of an RFID tag and a magneto acoustic marker.

16. The system of claim 15, wherein the first information includes at least one of a unique identifier for the asset, an asset type and a part number.

17. The system of claim 16, wherein the second information includes at least one of a unique identifier of the person, a type of employee, a shift indicator and an area indicator.

18. The system of claim 17, wherein the third information comprises at least one of a unique identifier of the location and a location type.

19. The system of claim 17, wherein the at least one value includes:
    a first value for at least one of a unique identifier for the asset, an asset type and a part number;
    a second value for at least one of a unique identifier of the person, a type of employee, a shift indicator and an area indicator; and
    a third value for at least one of a unique identifier of the location and a location type.

20. The system of claim 13, wherein the statistical test executed on the information in the record as compared to the at least one value comprises a statistical Z-test.

* * * * *